Patented Oct. 16, 1923.

1,470,711

UNITED STATES PATENT OFFICE.

HERMAN DELAHAYE, OF DESTELBERGEN, NEAR GHENT, BELGIUM.

PROCESS FOR MANUFACTURING VISCOSE WITH A VIEW TO THE MANUFACTURE OF ARTIFICIAL SILK AND LIKE PRODUCTS NOT LIABLE TO LOSE THEIR RESISTANCE BY CONTACT WITH WATER.

No Drawing. Application filed September 11, 1922. Serial No. 587,593.

*To all whom it may concern:*

Be it known that I, HERMAN DELAHAYE, a subject of the King of the Belgians, residing at Destelbergen, near Ghent, Kingdom of Belgium, have invented new and useful improvements in processes for manufacturing viscose with a view to the manufacture of artificial silk and like products not liable to lose their resistance by contact with water, of which the following is a specification.

The present invention relates to the manufacture of compounds known under the name of alkaline xanthogenates of cellulose which, dissolved in caustic alkali, gives rise to the product commonly known as viscose, the said invention consisting of a new process for the manufacture of such solutions of alkaline xanthogenates of cellulose or viscose, the object being to obtain a solution of the kind referred to or viscose which can be spun as soon as its manufacture is completed, and without it being necessary for same to undergo any maturation, with a view to the manufacture of artificial silk or like products not liable to lose their resistance appreciably when brought into contact with water.

It is well known that the viscose hitherto manufactured is not suitable for the manufacture of artificial silk or like products at the time when its manufacture is completed, and has to undergo a maturation or "ripening" of several days before it can be used for the manufacture of artificial silk. Moreover, while cellulose, before being treated with a view to the manufacture of artificial silk, is unaffected by the action of water, a cotton thread, composed of practically pure cellulose, being just as strong when wet as when dry, the artificial silk obtained by known processes, which is in fact cellulose regenerated after chemical dissolution, becomes, however, gelatinous by contact with water and loses the greater part of its resistance. This is due to the fact that the cellulose has to undergo hydration, e. g. to the fact that it retains water chemically, to be able to go into solution under the form of viscose.

Now, my present invention is based on the various reactions of caustic soda on cellulose, according to the temperatures and the degrees of concentration, and more particularly on the following facts: It is well known that when cotton thread, which is practically pure cellulose, is subjected to the operation known industrially under the name of "mercerizing" (by mercerizing is here and hereunder meant the operation to which cotton thread is subjected to obtain ultimately finished products well known in the hosiery and like trades as mercerized goods) its strength increases considerably. The said operation essentially consists in subjecting the cotton thread e. g. the cellulose, to treatment by concentrated caustic soda (30° to 40° Baumé) at ordinary temperature. The same result is obtained if the cotton is treated with a weaker solution of caustic soda (20° to 25° Baumé), but at a lower temperature, that is, about 0° Celsius.

The operation referred to increases the tenacity of the cellulose and to attain this result, the solutions of caustic soda used may be so much weaker than the temperature is lower.

While as stated above, in the known processes of manufacturing viscose intended for the manufacture of artificial silk, the cellulose has to be subjected to hydration in order that it can be dissolved under the form of viscose, so that it is too much hydrated to constitute a regenerated cellulose practically employable as soon as manufactured and the cellulose in solution has to become dehydrated by maturation. According to my process, on the contrary, the tenacity of the cellulose is increased by means of a treatment similar to mercerizing; then the cellulose undergoes a slight hydration so as not to retain a higher proportion of water than is contained in the cellulose of ordinary viscose after maturation.

The viscose obtained by my said new process for the manufacture of viscose can be used straight away for manufacturing artificial silk and like products as soon as its preparation is completed.

In order to manufacture viscose by the process forming the subject matter of the invention cellulose, in any form, but preferably in the form of cotton or wood-pulp, is subjected to a treatment similar to mercerizing. The cellulose is dipped or soaked in a concentrated solution of caustic soda at ordinary temperature or still better in a solution of caustic soda at 20 to 25° Baumé cooled to 0° Celsius, during about an hour. The excess of liquid is then removed by pressing in such a manner that the alkali-cellulose thus formed contains a quantity of caustic soda equal to a third up to one half of the weight of the cellulose used as raw material. Then the mass is reduced to pulp, but care must be taken that the two last-named operations are effected at a low temperature. To improve the mercerizing action of the caustic soda, the alkali-cellulose is left during one or more days in a chamber where the temperature is maintained at about 0° Celsius. Afterwards, the cellulose is subjected to a slight hydration by allowing the alkali-cellulose to remain during one or more days in a chamber where the temperature does not exceed 15° C. The mass is then ready for treatment with $C_2S$. The hydrated alkali-cellulose is treated in a closed vessel with 10 to 15% of carbon disulphide, care being taken that the temperature does not exceed 20° C. A xanthogenate of hydrated cellulose is thus formed.

In order to obtain a solution or viscose adapted for use to manufacture artificial silk by spinning or drawing, the xanthogenate formed in the above descrbed manner is dissolved by malaxing in a solution of caustic soda in such a manner as to obtain a viscose containing 5 to 8% of cellulose and 15 to 25% of caustic soda. To establish experimentally the difference which exists between the xanthogenate obtained by my new above described process, and that obtained by the known process for the manufacture of common viscose, it is sufficient to try to dissolve the said xanthogenate obtained by my new process in a solution of caustic soda calculated so as to obtain a viscose containing as usual 6 to 8% of cellulose and 6 to 7% of caustic soda (NaOH); instead of becoming dissolved, the said xanthogenate absorbs the caustic soda, and takes the form of a gelatinous mass which solidifies within a very short time. The viscose thus obtained by my improved process can be spun or drawn as soon as its manufacture is completed. It does not then contain any more water combined with cellulose than is contained after maturation in viscose manufactured by the known processes.

If the quantity of water still combined with the cellulose in the viscose obtained by my process could be still further reduced, the constitution of the resulting product would be very nearly the same as the constitution of the cellulose taken as starting point (cotton or wood-pulp); it will be readily understood that a regenerated cellulose nearly devoid of combined water must offer very little liability to be influenced by the contact of water, and must necessarily be stronger and more resisting than a highly hydrated cellulose. As the viscose obtained by my process has a high caustic soda content, it is able to hold in solution xanthogenates of cellulose only slightly hydrated, provided certain precautions are taken. If the said viscose is maintained at a temperature not exceeding 10° C. during one to 3 weeks, the xanthogenate of hydrated cellulose contained in such viscose becomes almost completely dehydrated, loses soda and carbon disulphide, and becomes polymerized without coagulating. It is very important to avoid coagulation, and in view of this the operation must be effected slowly and at a temperature which is not too high, in order that the transformation of the xanthogenate may take place with the greatest possible regularity.

The aforesaid viscose obtained by my improved process is, after a rest of one to three weeks at a maximum temperature of 10° C. suitable to manufacture an artificial silk which for all practical purposes does not lose its resistance when brought into contact with water. This artificial silk may, according to the invention, be manufactured by any known suitable method, means or machines, taking the aforesaid viscose obtained by my improved process as a starting point e. g. as the raw material for the manufacture proper of the artificial silk.

It should be understood that all the sodium products used in my process for the manufacture of viscose and of improved artificial silk not liable to lose its resistance by contact with water may if desired be replaced by corresponding products derived from other alkaline metals.

I claim:

1. The process of manufacturing viscose consisting first in soaking cellulose in a 20°—35° Baumé solution of caustic alkali at about 0° C. for about one hour, then in expelling under pressure the excess of caustic alkali and reducing the alkali cellulose into pulp while the mass is maintained at a low temperature, then in allowing the mass to stand for a period of one to several days at about 0° C., then in hydrating slightly by allowing the alkali cellulose to remain for a period of one to several days in a chamber where the temperature does not exceed 15° C., then in treating same with carbon disulphide at a temperature not exceeding 20° C., and finally in subjecting the alkaline xanthogenates of cellulose thus obtained to suitable treatment for obtaining an almost completely dehydrated final viscose, substantially as described.

2. The process of manufacturing viscose suitable for the manufacture of artificial silk of which the resistance is practically unaffected by contact with water, consisting first in soaking cellulose in a 20°—35° Baumé solution of caustic alkali at about 0° C. for about one hour, then in expelling under pressure the excess of caustic alkali and reducing the alkali-cellulose into pulp while the mass is maintained at a low temperature, then in allowing the mass to stand for a period of one to several days at about 0° C., then in hydrating slightly by allowing the alkali cellulose to remain for a period of one to several days in a chamber where the temperature does not exceed 15° C., then in treating same with carbon disulphide, at a temperature not exceeding 20° C., and finally in dissolving the alkaline xanthogenates of cellulose thus obtained in a solution of caustic alkali by malaxing and allowing the resulting viscose to stand during two to three weeks at a temperature not exceeding 10° C.

In testimony whereof I signed hereunto my name in the presence of two subscribing witnesses.

H. DELAHAYE.

Witnesses:
C. F. PFSELS,
C. DE WOLF.